United States Patent
Bergh

(10) Patent No.: US 9,518,827 B2
(45) Date of Patent: Dec. 13, 2016

(54) METHOD AND APPARATUS FOR MULTIPLEXING MULTIPLE SAGNAC INTERFEROMETERS WITH SINGLE INPUT FOR SOURCE LIGHT

(76) Inventor: Ralph A. Bergh, Lititz, PA (US)

( * ) Notice: Subject to any disclaimer, the term of this patent is extended or adjusted under 35 U.S.C. 154(b) by 154 days.

(21) Appl. No.: 13/696,258

(22) PCT Filed: May 7, 2011

(86) PCT No.: PCT/US2011/035661
§ 371 (c)(1),
(2), (4) Date: Nov. 5, 2012

(87) PCT Pub. No.: WO2011/140534
PCT Pub. Date: Nov. 10, 2011

(65) Prior Publication Data
US 2013/0050708 A1 Feb. 28, 2013

Related U.S. Application Data

(60) Provisional application No. 61/332,735, filed on May 7, 2010.

(51) Int. Cl.
*G01C 19/72* (2006.01)
(52) U.S. Cl.
CPC ........... *G01C 19/728* (2013.01); *G01C 19/721* (2013.01)
(58) Field of Classification Search
CPC .................................................. G01C 19/728
(Continued)

(56) References Cited

U.S. PATENT DOCUMENTS

| 4,299,490 A | 11/1981 | Cahill et al. |
| 4,634,282 A | 1/1987 | Shaw et al. |

(Continued)

FOREIGN PATENT DOCUMENTS

| KR | 100905378 B1 | 7/2009 |
| WO | WO0216985 A1 | 2/2002 |

(Continued)

OTHER PUBLICATIONS

International Search Report, Jan. 19, 2012.
(Continued)

*Primary Examiner* — Tarifur Chowdhury
*Assistant Examiner* — Omar Nixon
(74) *Attorney, Agent, or Firm* — George A. Leone; Citadel Patent Law

(57) ABSTRACT

A method and system for transmitting source light to a plurality of Sagnac interferometers includes a first directional coupler that splits the source light into a second light beam and a third light beam. The second light beam supplies light to a first Sagnac interferometer and the second light beam supplies light to a second directional coupler, and the first directional coupler also delivers light returning from the first Sagnac interferometer to a first detector that is used to indicate rotation of the first Sagnac interferometer. The second directional coupler splits the third light beam into a fourth light beam and a fifth light beam, and the fourth light beam supplies light to a second Sagnac interferometer. The second directional coupler delivers light returning from the second Sagnac interferometer to a second detector, and the second detector provides a signal indicative of rotation of the second Sagnac interferometer.

35 Claims, 4 Drawing Sheets

(58) Field of Classification Search
USPC .......................................................... 356/460
See application file for complete search history.

(56) References Cited

U.S. PATENT DOCUMENTS

| | | | |
|---|---|---|---|
| 4,702,600 A | 10/1987 | Handrich et al. | |
| 4,869,592 A | 9/1989 | Bergh | |
| 5,074,665 A | 12/1991 | Huang et al. | |
| 5,141,316 A | 8/1992 | Lefevre et al. | |
| 5,150,956 A | 9/1992 | Buhler et al. | |
| 5,181,078 A | 1/1993 | Lefevre et al. | |
| 5,189,488 A * | 2/1993 | Mark et al. | 356/462 |
| 5,260,768 A * | 11/1993 | Cordova et al. | 356/460 |
| 5,444,533 A * | 8/1995 | Nishiura et al. | 356/460 |
| 5,455,698 A * | 10/1995 | Udd | 398/79 |
| 5,485,274 A | 1/1996 | Kemmler | |
| 5,854,678 A | 12/1998 | Liu et al. | |
| 7,072,043 B1 * | 7/2006 | Shernoff | 356/460 |
| 7,167,250 B2 | 1/2007 | Chen et al. | |
| 8,497,994 B2 | 7/2013 | Bergh | |
| 8,610,995 B2 | 12/2013 | Bergh | |
| 2002/0118367 A1 | 8/2002 | Cordova et al. | |
| 2002/0145795 A1* | 10/2002 | Vakoc et al. | 359/337.4 |
| 2002/0146226 A1 | 10/2002 | Davis et al. | |
| 2003/0202187 A1 | 10/2003 | Lange et al. | |
| 2008/0094636 A1 | 4/2008 | Jin et al. | |
| 2008/0218765 A1 | 9/2008 | Bergh | |
| 2013/0050709 A1 | 2/2013 | Bergh | |

FOREIGN PATENT DOCUMENTS

| | | |
|---|---|---|
| WO | WO2007143369 A1 | 12/2007 |
| WO | 2009103015 A2 | 8/2009 |
| WO | WO/2012/008955 A1 | 1/2012 |

OTHER PUBLICATIONS

Written Opinion of the International Searching Authority, Jan. 19, 2012.
International Preliminary Report on Patentability, Nov. 13, 2012.
Herve Lefever, "The Fiber-Optice Gyroscope," Artech House (1992).
"Optical Fiber Rotation Sensing," Edited by William K. Burns, Academic Press (1993).
International Search Report, International App. No. PCT/US2010/041949, Mar. 23, 2011.
Written Opinion of the International Searching Authority, International App. No. PCT/US2010/041949, Mar. 23, 2011.
International Preliminary Report on Patentability, International App. No. PCT/US2010/041949, Jan. 15, 2013.
International Preliminary Report on Patentability, International App. No. PCT/US09/34140, Aug. 17, 2010.
International Search Report, International App. No. PCT/US09/34140, Aug. 31, 2009.

* cited by examiner

METHOD AND APPARATUS FOR MULTIPLEXING MULTIPLE SAGNAC INTERFEROMETERS WITH SINGLE INPUT FOR SOURCE LIGHT

PRIORITY CLAIM

The present non-provisional patent application claims priority to U.S. provisional application Ser. No. 61/332,735, entitled "Multiple Fiber Optic Gyros (FOGs) With A Single Light Source", filed on May 7, 2010, the disclosure of which is incorporated by reference.

FIELD OF THE INVENTION

The present invention relates in general to fiber optic gyros and, more particularly, to using a light source or multiple light sources transmitted through a single optical conduit, such as an optical fiber, to power multiple fiber optic gyroscopes (FOGs).

BACKGROUND OF THE DISCLOSURE

A fiber optic gyro (FOG) Sagnac interferometer is used to measure rotation. A directional coupler is often used to direct some light returning from the Sagnac interferometer to a detector. A consequence of using a directional coupler for this purpose is that some of the light from the light source is discarded by the directional coupler before any light enters the Sagnac interferometer.

One useful type of fiber optic gyroscope is disclosed in PCT patent application publication number WO2009/103015, published on Aug. 20, 2009 and entitled "AN INTERFEROMETER EMPLOYING A MULTI-WAVEGUIDE OPTICAL LOOP PATH AND FIBER OPTIC ROTATION RATE SENSOR EMPLOYING SAME," where the inventor is the same inventor herein. The entire contents of PCT patent application publication number WO2009/103015 are incorporated herein by reference.

Another useful type of fiber optic gyroscope is disclosed in U.S. Pat. No. 7,505,139, issued Mar. 17, 2009 to the same inventor of the present disclosure and entitled "SIGNAL PROCESSING FOR A SAGNAC INTERFEROMETER." The entire contents of U.S. Pat. No. 7,505,139 are incorporated herein by reference.

The present disclosure presents a new and novel configuration for usefully and effectively employing light that was discarded in previous methods and devices for activating multiple fiber optic gyroscopes.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one example, a method of transmitting source light to supply light to a plurality of Sagnac interferometers includes a first directional coupler that splits the source light into a second light beam and a third light beam. The second light beam supplies light to a first Sagnac interferometer and the second light beam supplies light to a second directional coupler, and the first directional coupler also delivers light returning from the first Sagnac interferometer to a first detector that is used to indicate rotation of the first Sagnac interferometer. The second directional coupler splits the third light beam into a fourth light beam and a fifth light beam, and the fourth light beam supplies light to a second Sagnac interferometer. The second directional coupler delivers light returning from the second Sagnac interferometer to a second detector, and the second detector provides a signal indicative of rotation of the second Sagnac interferometer.

In another aspect, a third directional coupler splits the fifth light beam into a sixth and seventh light beam, and the sixth light beam supplies light to a third Sagnac interferometer, and the third directional coupler delivers light returning from the third Sagnac interferometer to a third detector and the third detector provides a signal indicative of rotation of the third Sagnac interferometer.

In another aspect, the fifth light beam is directed to a detector to measure noise of the source light to be used to reduce noise in the rotation measurement.

In another aspect, the seventh light beam is directed to a detector to measure noise of the source light to be used to reduce noise in the rotation measurement.

In another aspect, the seventh light beam is directed to additional fiber optic gyroscopes.

In another aspect, the source light is generated by a plurality of light sources.

In another aspect, establishing the source light comprises using a single light source transmitted through an optical path.

In another aspect, establishing the source light comprises using a plurality of light sources transmitted through a single optical path.

In another aspect, the plurality of light sources are multiplexed into the single optical path.

In another aspect, a noise detector is coupled to the optical wave.

In another aspect, passing an optical wave comprises optically coupling the optical wave to a first directional coupler at the input of a first Sagnac interferometer comprising a multifunction optical chip and a fiber coil.

In another aspect, the light source is optically coupled to a first directional coupler at the input of a first Sagnac interferometer comprising a multifunction optical chip and a fiber coil; and the first directional coupler also sends light to a second directional coupler that splits the light from the first directional coupler to send part of the light to a second Sagnac Interferometer.

In another aspect, the second directional coupler sends light to a third directional coupler; where light from the second directional coupler is split into two waves by the third directional coupler to go to a third Sagnac interferometer and to either be discarded or sent to a fourth directional coupler and a fourth Sagnac interferometer and so on for a predetermined number of "n" FOGs, where n is an integer.

In another aspect, the directional couplers transmit to a selected one of the multifunction optical chips.

In another aspect equalizing signals are transmitted to the plurality of detectors.

In another aspect the light at the last, or nth, detector, is maximized where the coupling ratio for the nth directional coupler at least 50%.

In another aspect the equation that determines the coupling ratios is $$K_i = 1 - K_{i+1} + K_{i+1}^2$$

where $K_i$ is the coupling ratio of the ith directional coupler.

In another aspect a plurality of isolators are coupled between each of the directional couplers.

In another aspect the Sagnac interferometer comprises an open-loop FOG.

In another aspect the Sagnac interferometer comprises a closed-loop FOG.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

Figure 1:
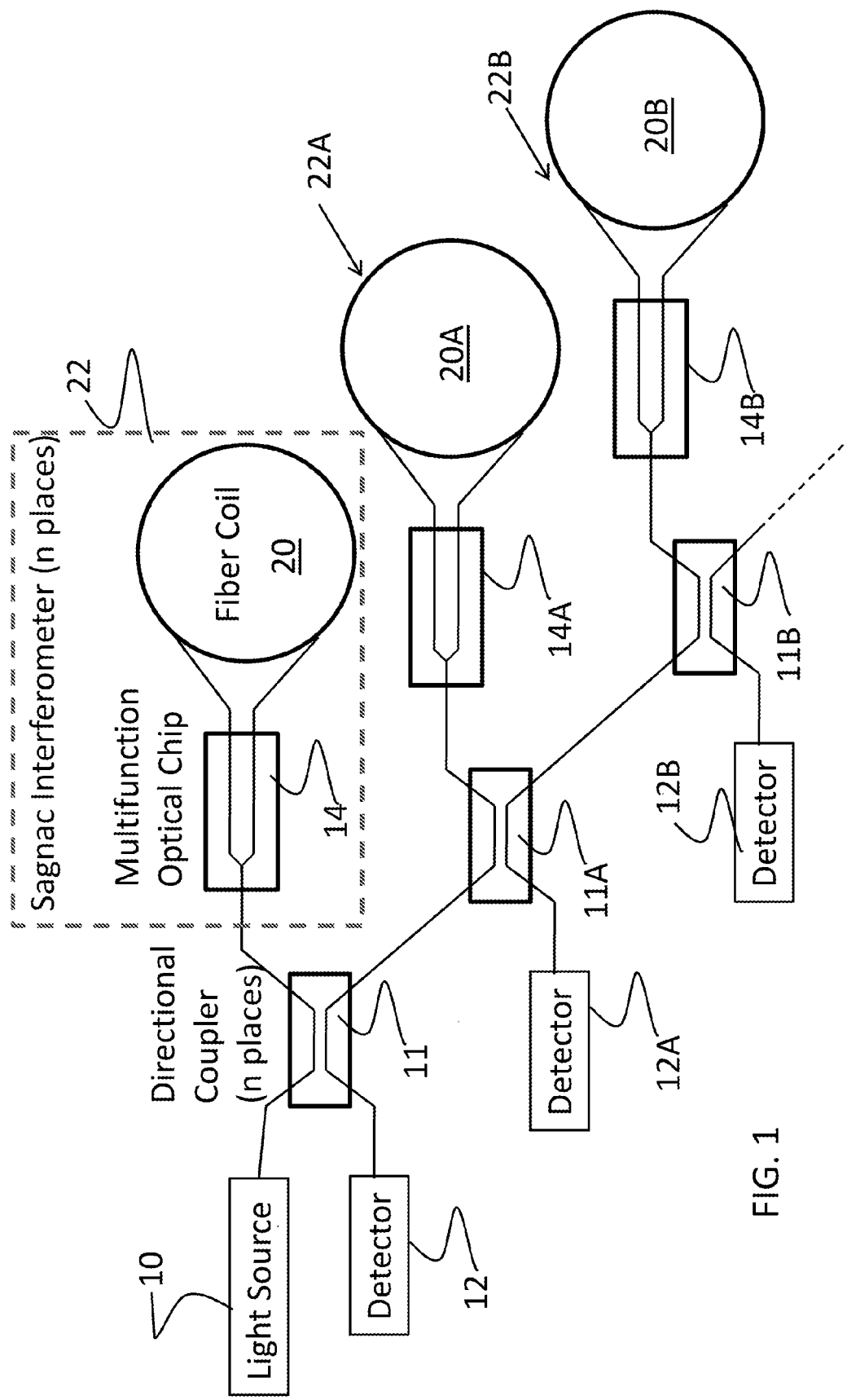
FIG. 1 schematically shows an example of a system including multiple FOGs with a single input for source light.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments and systems for using a single light source to power multiple fiber optic gyroscopes (FOGs). Several features of methods and systems in accordance with example embodiments are set forth and described in the Figures. It will be appreciated that methods and systems in accordance with other example embodiments can include additional procedures or features different than those shown in the Figures.

Additionally, methods and systems in accordance with several example embodiments may not include all of the features shown in these Figures. Throughout the Figures, identical reference numbers refer to similar or identical components or procedures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Further- more, the particular features, structures, or characteristics may be combined in any suitable manner in one or more embodiments.

As used herein "source light" means light comprising many coincident light waves even from a single light source. The source light may comprise an infinite number of waves.

As used herein "FOG" means fiber optic gyroscope.

Referring now to FIG. 1, an example of a system including multiple FOGs with a single input for source light is schematically shown. A system of multiple FOGs includes a light source 10, a plurality of directional couplers 11, a plurality of detectors 12, a plurality of multifunction optical chips 14 and a plurality of fiber coils 20. In operation, the configuration uses the light source 10 to provide the light for a plurality of Sagnac Interferometers 22. The light source 10 is optically coupled to a first directional coupler 11 at the input of a first Sagnac interferometer 22 comprising a multifunction optical chip 14 and a fiber coil 20. The first directional coupler 11 is also used to send light that was previously discarded to a second directional coupler 11A. The second directional coupler 11A splits the light from the first directional coupler 11 to send part of the light to a second Sagnac Interferometer 22A and to a third directional coupler 11B. Light from the second directional coupler 11A is then split into two waves by the third directional coupler 11B to go to a third Sagnac interferometer 22B and to either be discarded or sent to a fourth directional coupler and a fourth Sagnac interferometer and so on for a predetermined number of "n" FOGs, where n is an integer.

Figure 4:
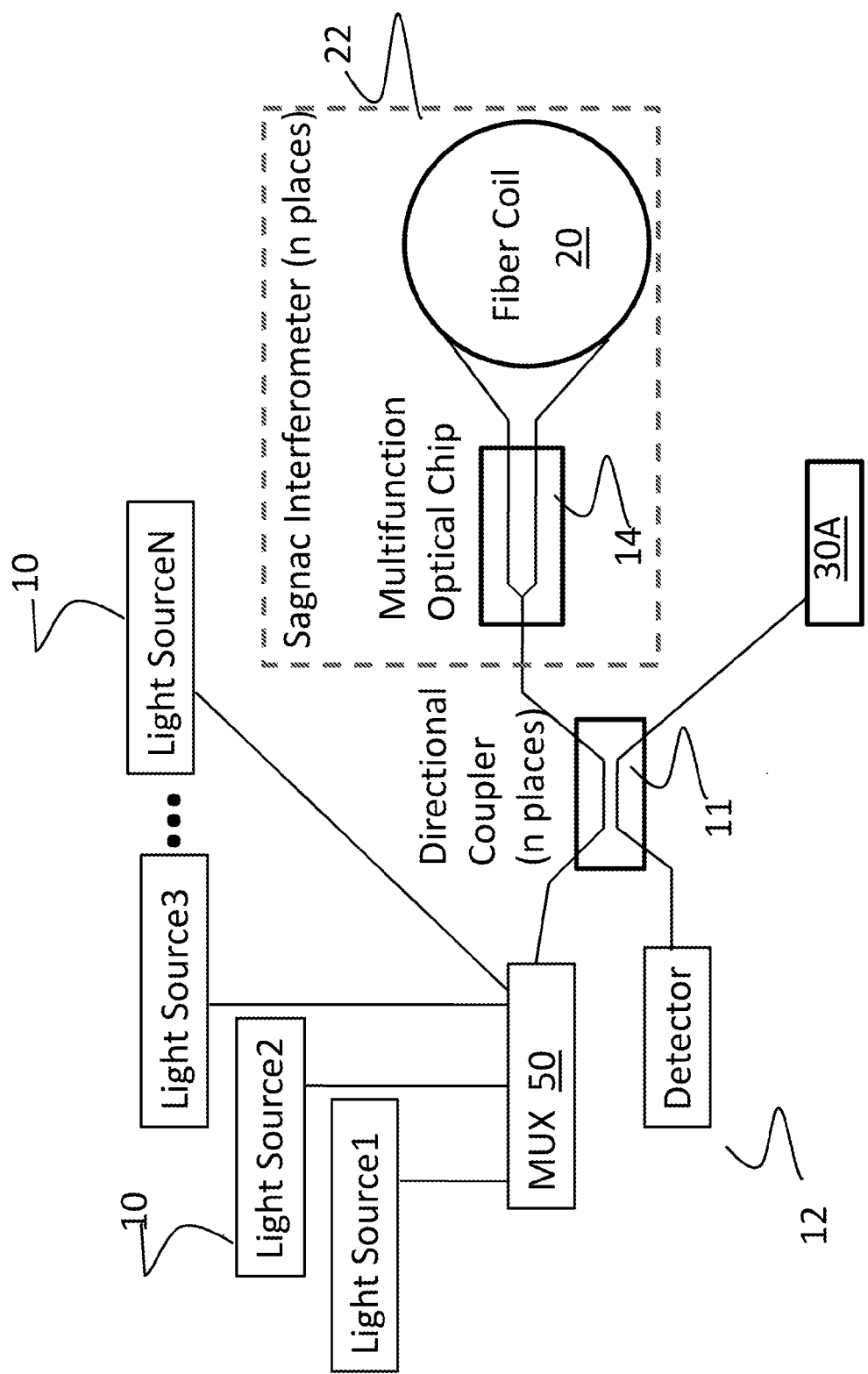
FIG. 4 schematically shows an example of multiplexing a plurality of light sources to provide a single input for source light.

As shown in more detailed with reference to FIG. 4, the light source 10 may comprise a plurality of light sources 1, 2, 3 . . . N. The plurality of light sources may be multiplexed in any combination either singly or multiply through an optical multiplexor 50. The output of the optical multiplexor 50 can be coupled to a single optical input such as a directional coupler 11 to provide a single optical light wave to one or more Sagnac interferometers. In this way a redundant system of light sources may be employed.

Figure 2:
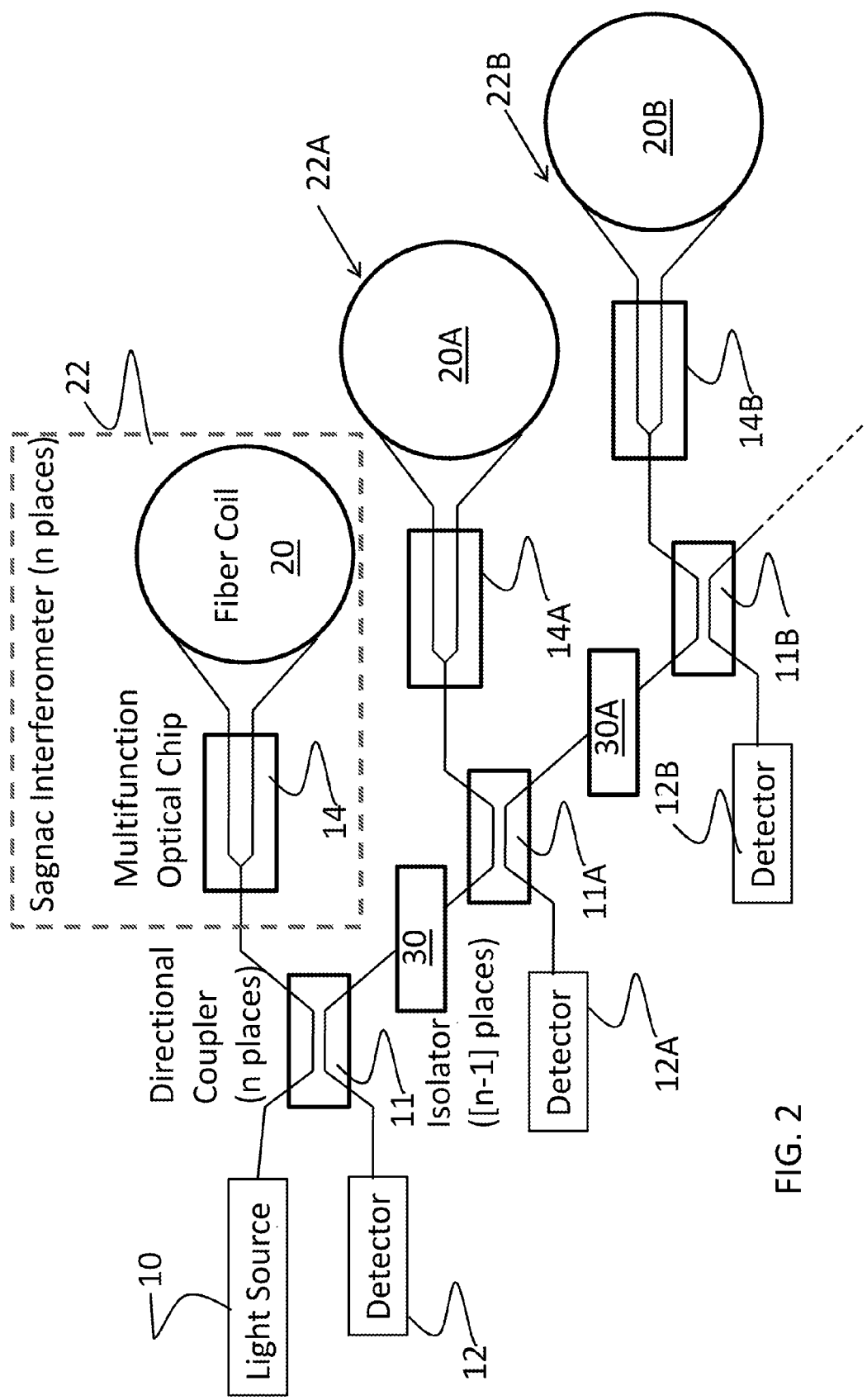
FIG. 2 schematically shows an example of a system including multiple FOGs with a single input for source light and isolators.

Referring now to FIG. 2, an example of a system including multiple FOGs with a single input for source light and isolators is schematically shown. In this alternate configuration, a plurality of isolators 30 is used between the directional couplers 11. The isolators 30 are each coupled between directional couplers 11, where the directional couplers transmit light to the multifunction optical chips. The isolators reduce the possibility of a signal from Sagnac interferometer m mixing with signals from multiple Sagnac interferometers 1, 2, and 3 . . . m−2 and m−1.

The system may advantageously be designed to equalize the signals to the detectors by selecting directional couplers with specified coupling ratios. To maximize the light at the last, or nth, detector, the coupling ratio for the nth directional coupler should be approximately 50%. This means that the last coupler should split the light evenly between the light that is discarded and the light that is sent to the last Sagnac interferometer. If the components are lossless, it is not difficult to calculate the ideal coupling ratios of the other directional couplers to equalize the optical power on the respective detectors. The equation that determines the ideal coupling ratios is $$K_i = 1 - K_{i+1} + K_{i+1}^2$$

Where $K_i$ is the coupling ratio of the ith directional coupler. Using this equation a table can be created for the coupling ratios in the ideal case of lossless components. The first column of the table identifies the directional coupler, the lower the number, the closer the directional coupler is to the light source. Let's begin with the case of 3 FOGs

| i | $K_i$ |
|---|---|
| 1 | 0.8125 |
| 2 | 0.75 |
| 3 | 0.5 |

In the case of 4 FOGs the ideal coupling ratios to four decimal places are

| i | $K_i$ |
|---|---|
| 1 | 0.8477 |
| 2 | 0.8125 |
| 3 | 0.75 |
| 4 | 0.5 |

In the case of 7 FOGs, the ideal coupling ratios to four decimal places are

| i | $K_i$ |
|---|---|
| 1 | 0.9002 |
| 2 | 0.8875 |
| 3 | 0.8709 |
| 4 | 0.8477 |
| 5 | 0.8125 |
| 6 | 0.75 |
| 7 | 0.5 |

In each case, the last directional coupler has a splitting ratio of 0.5 or 50%; the next to the last directional coupler has a coupling ratio of 0.75 or 75 percent; the second to the last directional coupler has coupling ratio of about 0.81 or 81%; and the list goes on for as many FOGs as are included in the multiplexed system.

Figure 3:
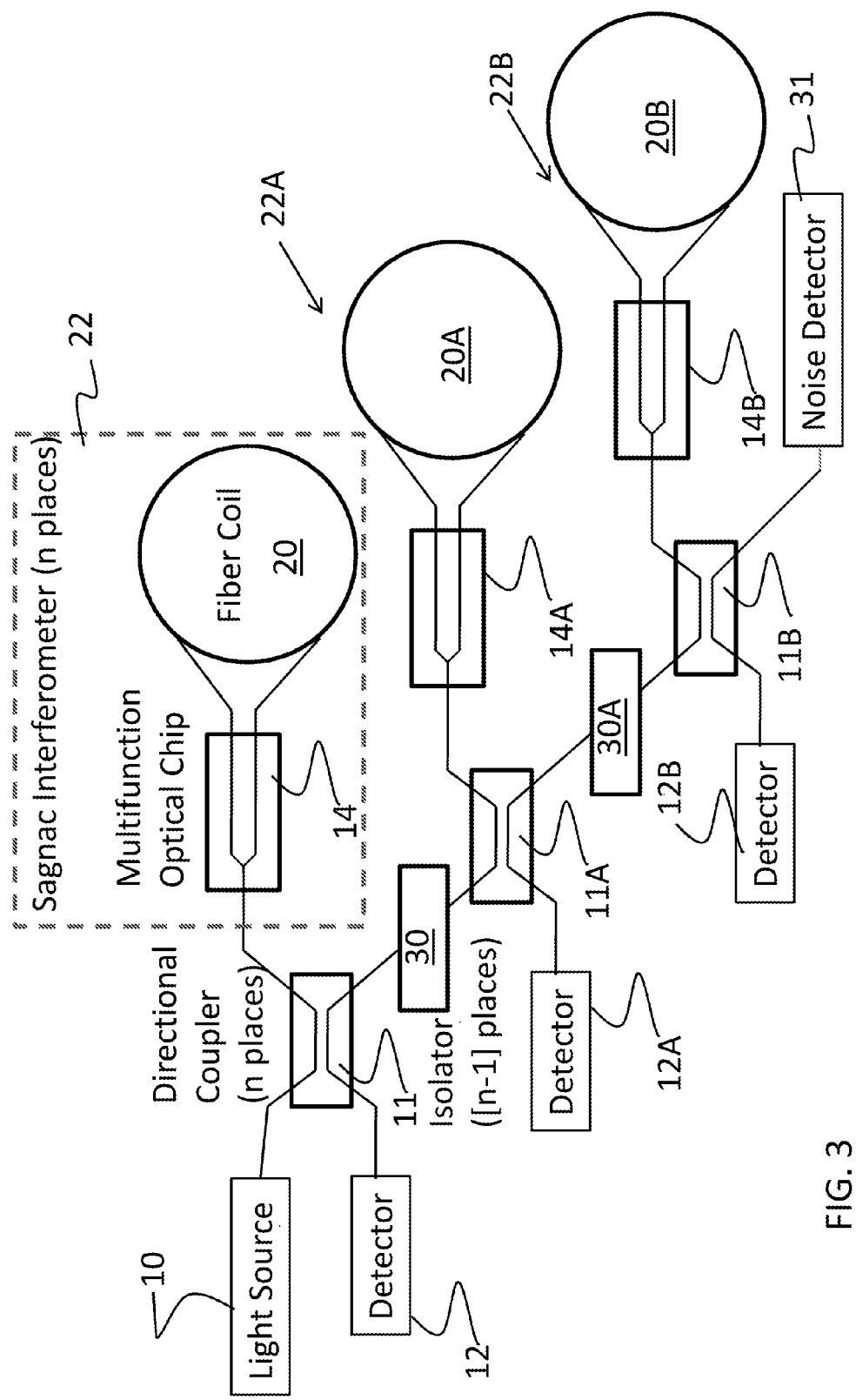
FIG. 3 schematically shows an example of a system including multiple FOGs with a single input for source light including a noise detector.

Referring now to FIG. 3, an example of a system including multiple FOGs with a single input for source light, isolators and a noise detector is schematically shown. In this alternate configuration, a noise detector 31 is coupled to the output of the last directional coupler in order to provide information about system noise.

Light used in a fiber optic gyroscope (FOG) based on a Sagnac interferometer covers a range of frequencies and has a short coherence length. This light is termed broadband light because it is much broader than single frequency light. This light is a combination of an infinite number of light waves. These light waves combine together and interfere with each other, and this interference causes the intensity of the light to vary. In a FOG rotation rate information is converted in a Sagnac interferometer from phase of the light to the intensity of the light and ultimately this intensity information is converted to an electrical signal by a detector. The natural variation of intensity can be confused with rotation rate information encoded in the intensity. As such the intensity variation due to the broadband nature of the source light contributes a noise in a FOG. The intensity variation is also known as random intensity noise (RIN). RIN is present as the light is generated and can be measured before the signal is added to the light and, as a result, it can be distinguished from the rotation-rate signal.

In the presently disclosed multiplexed design, RIN may be measured with a single noise detector 31 placed at an output of a directional coupler as shown in FIG. 3. The noise detector 31 detects source light that has not gone through the interferometer. The RIN measured by the noise detector is then subtracted from the signal to remove this component of the noise. This is only possible if the RIN at the noise detector is the same as the RIN on the detectors, and this is only possible if the Sagnac interferometers use fiber that preserve state-of-polarization of the light.

This design will work with both open-loop FOGs and closed-loop Fogs, but the preferred embodiment is to use closed-loop FOGs to reduce crosstalk. Light that is reflected from the source or detector upon return from one sensor might be part of the source light for another sensor. This contaminating reflected light contains less information if the FOG is operated in closed-loop mode.

A person skilled in the art will recognize that changes can be made in form and detail, and equivalents may be substituted for elements of the invention without departing from the scope and spirit of the invention. The present description is therefore considered in all respects to be illustrative and not restrictive, the scope of the invention being determined by the following claims and their equivalents as supported by the above disclosure and drawings.

What is claimed is:

1. A method of transmitting source light to supply light to a plurality of Sagnac interferometers comprising:
coupling said source light into a first directional coupler to split said source light into a second light beam and a third light beam and supplying light from said second light beam to a first Sagnac interferometer and supplying light from said third light beam to a second directional coupler;
further coupling said first directional coupler to deliver light returning from said first Sagnac interferometer to a first detector and operating said first detector to provide a signal indicative of rotation of said first Sagnac interferometer; and
coupling said third light beam into said second directional coupler that splits said third light beam into a fourth light beam and a fifth light beam, supplying light from said fourth light beam to a second Sagnac interferometer and further coupling said second directional coupler to deliver light returning from said second Sagnac interferometer to a second detector, and operating said second detector to provide a signal indicative of rotation of said second Sagnac interferometer.

2. The method of claim 1 further comprising:
coupling said fifth light beam into a third directional coupler to split said fifth light beam into a sixth and a seventh light beam, and supplying light from said sixth light beam to a third Sagnac interferometer, and further coupling said third directional coupler to deliver light returning from said third Sagnac interferometer to a third detector and operating said third detector to provide a signal indicative of rotation of said third Sagnac interferometer.

3. The method of claim 2 further comprising directing said seventh light beam to a detector to measure noise of the source light to be used to reduce noise in the rotation measurement.

4. The method of claim 2 further comprising splitting and directing said seventh light beam to additional fiber optic gyroscopes.

5. The method of claim 2 said third directional coupler has a splitting ratio approximately equal to 0.5 and said second directional coupler has a splitting ratio that is approximately equal to 0.75 and said first directional coupler has a splitting ratio that is approximately equal to 0.82.

6. The method of claim 1 further comprising directing said fifth light beam to a detector to measure noise of the source light to be used to reduce noise in the rotation measurement.

7. The method of claim 1 wherein the source light is generated by a plurality of light sources.

8. The method of claim 1 wherein establishing the source light comprises using a single light source transmitted through an optical path.

9. The method of claim 1 wherein establishing the source light comprises using a plurality of light sources transmitted through a single optical path.

10. The method of claim 9 wherein the plurality of light sources are multiplexed into the single optical path.

11. The method of claim 1 further comprising coupling a noise detector to the source light.

12. The method of claim 1 wherein said first Sagnac interferometer is comprised of a multifunction optical chip and a fiber coil.

13. The method of claim 12 further comprising splitting said fifth light beam into two light beams by the third directional coupler a sixth light beam to go to a third Sagnac interferometer and a seventh light beam to either be discarded or sent to a fourth directional coupler and a fourth Sagnac interferometer and so on for a predetermined number of "n" FOGs, where n is an integer.

14. The method of claim 13 wherein each of the plurality of Sagnac interferometers includes a multifunctional chip and each of the directional couplers transmits to a selected one of the multifunction optical chips.

15. The method of claim 14 further comprising equalizing signals to the plurality of detectors.

16. The method of claim 1 further comprising maximizing the light at the last, or nth, detector, where the coupling ratio for the nth directional coupler is substantially 50%.

17. The method of claim 1 further comprising coupling at least one of a plurality of isolators between each of the directional couplers.

18. The method of claim 1 where at least one of the plurality of Sagnac interferometers comprises an open-loop FOG.

19. The method of claim 1 where at least one of the plurality of Sagnac interferometers comprises a closed-loop FOG.

20. An inertial measurement system comprising:
an optical light wave source for establishing at least a single optical light wave; and
a first directional coupler that splits said at least single optical light wave into a second light beam and a third light beam, said first directional coupler coupled to supply light from said second light beam to a first Sagnac interferometer of a plurality of Sagnac interferometers and from said third light beam to a second directional coupler, and also coupled to deliver light from said first directional coupler returning from said first Sagnac interferometer to a first detector of a plurality of detectors that indicates rotation of said first Sagnac interferometer; and
said second directional coupler receives and splits said third light beam into a fourth light beam and a fifth light beam, and supplies light from said fourth light beam to a second Sagnac interferometer and delivers light from said second directional coupler returning from said second Sagnac interferometer to a second detector, where said second detector provides a signal indicative of rotation of o-n-ly said second Sagnac interferometer.

21. The system of claim 20 wherein the at least single optical light wave source comprises a plurality of light sources.

22. The system of claim 21 wherein the plurality of light sources are multiplexed to be optically coupled to a single optical path.

23. The system of claim 22 wherein the optical light wave source is optically coupled to a first directional coupler at the input of a first Sagnac interferometer and wherein each of the plurality of Sagnac interferometers comprises a multifunction optical chip and a fiber coil.

24. The system of claim 23 wherein the second directional coupler sends light to a third directional coupler; and where light from the second directional coupler is split into two light beams by the third directional coupler a sixth light beam to go to a third Sagnac interferometer and a seventh light beam to either be discarded, sent to a detector to measure noise or sent to a fourth directional coupler and a fourth Sagnac interferometer and so on for a predetermined number of FOGs.

25. The system of claim 24 further comprising a plurality of isolators, at least one isolator being coupled between each of the directional couplers.

26. The system of claim 25 wherein the directional couplers transmit light to a selected one of the multifunction optical chips and the directional couplers also transmit a portion of light returning from said selected one of the multifunction chips to one of the plurality of detectors.

27. The system of claim 26 wherein signals to the plurality of detectors are equalized by selecting directional couplers with specified coupling ratios.

28. The system of claim 20 wherein to maximize the light at the last, or nth, detector, the coupling ratio for the nth directional coupler substantially being 50%.

29. The system of claim 21 the splitting ratio of said third detector is between 0.2 and 0.8 and the splitting ratio of said second coupler is between 0.55 and 0.91 and the splitting ratio of said first coupler is between 0.55 and 0.91 wherein said second light beam has less power than said third light beam and wherein said fourth light beam has less power than said fifth light beam.

30. The system of claim 20 where at least one of the plurality of Sagnac interferometers comprises an open-loop FOG.

31. The system of claim 20 where at least one of the plurality of Sagnac interferometers comprises a closed-loop FOG.

32. The method of claim 1 wherein each of the plurality of Sagnac interferometers includes a multifunctional chip and each of the directional couplers transmits to a selected one of the multifunction optical chips.

33. A method of transmitting source light to supply light to a plurality of Sagnac interferometers comprising:
a plurality of directional couplers each consisting of four ports;
coupling said source light into a first port of a first directional coupler to split said source light into a second light beam that emerges from a second port of said first directional coupler and a third light beam that emerges from a third port of said first directional coupler and supplying light from said second light beam to a first Sagnac interferometer and supplying light from said third light beam to a first port of a second directional coupler;
further supplying light returning from said first Sagnac interferometer to said second port of said first directional coupler to split said returning light into a fourth light beam that emerges from said first port of said first directional coupler and a fifth light beam that emerges from a fourth port of said first directional coupler and supplying said fifth light beam to a first detector and operating said first detector to provide a signal indicative of rotation of said first Sagnac interferometer; and coupling said third light beam into said first port of said second directional coupler that splits said third light beam into a sixth light beam that emerges from a second port of said second directional coupler and a seventh light beam that emerges from a third port of said first directional coupler, supplying light from said sixth light beam to a second Sagnac interferometer and supplying light returning from said second Sagnac interferometer to said second port of said second directional coupler to split said returning light into an eighth light beam that emerges from said first port of said second directional coupler and a ninth light beam that emerges from a fourth port of said second directional coupler and supplying said ninth light beam to a second detector, and operating said second detector to provide a signal indicative of rotation of said second Sagnac interferometer.

34. The method of claim 33 further comprising:

coupling said seventh light beam into a first port of a third directional coupler that splits said seventh light beam into a tenth light beam that emerges from a second port of said third directional coupler and an eleventh light beam that emerges from a third port of said third directional coupler, supplying light from said tenth light beam to a third Sagnac interferometer and supplying light returning from said third Sagnac interferometer to said second port of said third directional coupler to split said returning light into a twelfth light beam that emerges from said first port of said third directional coupler and a thirteenth light beam that emerges from a fourth port of said third directional coupler and supplying said thirteenth light beam to a third detector, and operating said third detector to provide a signal indicative of rotation of said third Sagnac interferometer.

35. The method of claim 34 wherein said third directional coupler has a splitting ratio that is optimally 0.5 but at least between 0.2 and 0.8 and said second directional coupler has a splitting ratio that is optimally 0.75 but at least between 0.55 and 0.91 said first directional coupler has a splitting ratio that is optimally 0.82 but at least between 0.55 and 0.91 wherein said second light beam has less power than said third light beam and said fourth light beam has less power than said fifth light beam.

* * * * *